United States Patent [19]

Reeve et al.

[11] Patent Number: 4,599,320
[45] Date of Patent: Jul. 8, 1986

[54] REFRACTORY LINING MATERIAL FOR ELECTROLYTIC REDUCTION CELL FOR ALUMINUM PRODUCTION AND METHOD OF MAKING THE SAME

[75] Inventors: Martin R. Reeve, Beaconsfield; Adam J. Gesing, Kingston, both of Canada

[73] Assignee: Alcan International Limited, Montreal, Canada

[21] Appl. No.: 565,861

[22] Filed: Dec. 27, 1983

[30] Foreign Application Priority Data

Dec. 30, 1982 [GB] United Kingdom ................ 8236931

[51] Int. Cl.⁴ ...................... C04B 35/58; B01D 39/06
[52] U.S. Cl. ...................................... 501/96; 501/97; 501/153; 55/523; 427/294
[58] Field of Search ................... 501/97, 96, 153, 80; 55/523; 428/689, 697, 698; 427/376.1, 376.6, 294, 295

[56] References Cited

U.S. PATENT DOCUMENTS 3,198,625  8/1965  Stroup ................................... 75/68
4,257,810  3/1981  Narumiya ........................... 501/153

Primary Examiner—William R. Dixon, Jr.
Assistant Examiner—Karl Group
Attorney, Agent, or Firm—Cooper, Dunham, Clark, Griffin & Moran

[57] ABSTRACT

A method of making a refractory material, e.g. suitable for use in lining Al electrolytic cells, comprises passing molten Al containing suspended particles of a transition metal diboride (e.g. $TiB_2$) through a refractory filter, on and in which the particles are deposited. The filter can be used as it is, or compressed and sintered, or comminuted and formed into bodies. The concentration of the diboride may be at least 25% on the upstream surface of the filter but progressively reduced with increasing distance from that surface.

9 Claims, No Drawings

REFRACTORY LINING MATERIAL FOR ELECTROLYTIC REDUCTION CELL FOR ALUMINUM PRODUCTION AND METHOD OF MAKING THE SAME

The present invention relates to refractory lining material for an electrolytic reduction cell for the production of aluminium.

In some constructions of electrolytic cells for this purpose it has been found desirable to eliminate the conventional carbon lining material, because of the tendency of the known carbon lining to form aluminium carbide by reaction with the molten aluminium and because it is necessary to maintain a layer of frozen electrolyte in contact with the side walls of the cell to protect the carbon lining from attack by the molten electrolyte.

Any refractory material, which can obviate the above objections to a carbon lining, must be resistant to attack by both molten aluminium and the cell electrolyte.

It has already been proposed to line reduction cells with various non-carbonaceous refractory materials. Amongst other materials proposed for this purpose it has been proposed to line a cell with tiles formed from ceramic hard metal fabricated from transition metal borides. Examples of suitable materials are $TiB_2$, $ZrB_2$, $HfB_2$, $VB_2$, $NbB_2$, $CrB_2$ and mixtures thereof. One preferred material for this application is $TiB_2$.

$TiB_2$ tiles comply with the requirement for resistance to attack by molten aluminium and molten cell electrolyte. They have the additional advantage of being wetted by molten aluminium. However, the cost of bulk $TiB_2$ is high and the object of the present invention is to provide a cell lining material which is capable of providing similar resistance to attack at lower material costs by providing composites of $TiB_2$ (or other ceramic transition metal diborides) with relatively low cost refractory materials capable of withstanding the maximum temperatures experienced in the reduction cell, but otherwise insufficiently resistant to attack by molten cell electrolyte. Even when the refractory substrate is resistant to molten electrolyte (e.g. aluminium nitride) it may still be desirable to provide a $TiB_2$-rich surface because of the wettability of the latter by molten aluminium.

It is already known to produce Al-$TiB_2$ master alloys, in which $TiB_2$ is present in the form of very fine particles dispersed in an aluminium matrix. The $TiB_2$ particles are insoluble in molten aluminium at temperatures at which molten aluminium is normally cast. The present invention is based on the concept of passing molten aluminium, containing suspended $TiB_2$ particles through a filter composed of the selected refractory material so as to form an intimate mixture of $TiB_2$ with the refractory material.

In a preferred method of carrying the invention into effect the selected refractory material is formed into a porous coherent sheet, which is permeable to molten aluminium and suspended $TiB_2$ particles are filtered out of the molten aluminium, so that a surface layer of $TiB_2$ or $TiB_2$-enriched particles are left on the upstream surface of the porous refractory sheet. The porous composite refractory-$TiB_2$ sheet thus formed in then preferably fired to densify the sheet and reduce its porosity.

Composites thus formed still contain residual Al metal. This is in no way detrimental to the end of use of the product. In fact it is even beneficial because of an improvement in low temperature toughness, and thermal shock and oxidation resistance. Other methods of producing cermets of transition metal borides with Al metal are disclosed in our co-pending British Application No. 8236932 filed Dec. 30, 1982.

In another method, which may be preferable in some circumstances, the $TiB_2$-containing aluminium is filtered through the refractory and the resultant filter cake is ground, formed into green tiles employing conventional techniques and then fired to form a dense ceramic tile. As compared with the former method this latter method results in a tile of uniform composition and this in fact may be less satisfactory in operation than the tile produced by the former method, in which the surface of the final product has an enhanced $TiB_2$ content as compared with the remainder of the tile. However, it may be advantageous as a prroduction method in that the interstices in a non-compacted granular filter layer may allow more rapid filtration of the aluminium alloy.

In the production of an insulating tile in accordance with the invention the product contains at least 25% $TiB_2$ at the hot surface of the tile (the surface exposed to molten aluminium and/or electrolyte) but this may progressively reduce to zero towards the opposite face when the preferred method of manufacture is employed. However, where this method of production is employed the $TiB_2$ content at the hot surface will preferably approach 100%.

As already stated the object of the present method is to provide a relatively inexpensive method of achieving a $TiB_2$ (or other diboride) refractory composite. The present invention is based on well-established industrial techniques and employs raw materials commercially available in bulk.

The method comprises two stages, namely:

(1) Production of a molten Al alloy containing suspended particles of $TiB_2$ (or other transition metal diboride).

(2) Separation of diboride particles from the molten Al by filtration through a refractory filter comprised of the refractory material with which it is desired to produce the composite.

Production of the alloy may be achieved by the tecnhique already well-established for commercial production of Al-Ti-B master alloys e.g. containing 5% Ti and 1% B. A mixture of potassium titanium fluoride ($K_2TiF_6$) and potassium borofluoride ($KBF_4$) in suitable proportions is introduced into a stirred bath of molten Al at a temprature within the range of 750°–900° C. An electric induction furnace with a silicon carbide crucible is commonly used as the alloying vessel, into which the required quantity of mixed salts is fed in a continuous stream, with furnace power on. In the present method, the relative proportions of the two salts are preferably adjusted so as to provide Ti and B in the melt in approximately the stoichiometric ratio of $TiB_2$, i.e. approximately 2.2:1.

The adjustment should preferably be such as to produce an alloy which is slightly Ti-rich so as to avoid precipitation of aluminium borides, (e.g. $AlB_2$ or $AlB_{12}$). Any desired amount of Ti and B may be added in this way, provided the relative proportions remain as defined above, the quantity should not be such as seriously to reduce the fluidity of the molten Al (rendering it more difficult to filter). Preferably the $TiB_2$ content of the Al alloy will be in the range of 4–8%.

After alloying is completed, the furnace is slightly tilted to pour off a molten potassium aluminium fluoride reaction product.

In the second stage of the method, the molten metal is poured into a heated filtration vessel. This may comprise an upright tapered cast iron or steel shell, lined with alumina or other suitable molten-Al resistant refractory, in the bottom of which the filter is positioned. Provision is preferably made on the down-stream side of the filter for applying reduced pressure by means of a vacuum pump, to draw the metal through the filter and into a receiving vessel. The metal can then, if desired be recycled to the induction furnace for preparation of a fresh batch of the alloy.

In one method, the filter comprises a porous carbon or foamed alumina or alumina-rich refractory plates (suitably dimensioned for subsequent fabrication) pervious to molten Al. Preferred materials for the plate are based on alumina or aluminium nitride or oxynitride. Silicon nitride or silicon aluminium oxynitride are less preferred materials which can also be used. The $TiB_2$ particles are entrapped and retained in the network of pores within the plate, particularly on the upstream side. There is thus a gradient in $TiB_2$ particle content from the upstream to the downstream side of the plate. The $TiB_2$ concentration on the upstream side of the refractory plate is a function of plate porosity, pore size, and the quantity and $TiB_2$ content of the molten aluminium filtered through the refractory plate.

However, it is preferred that the filter would comprise a plate or disc-shaped compact of pressed, unbonded, or lightly sintered refractory aggregate. Suitable particle size distribution in such an aggregate can make it permeable to molten aluminium under filtering conditions and at the same time reactive enough to permit densification through subsequent sintering. Powders that can be used for such aggregates include: alumina, aluminium oxynitride, silicon oxynitride, AlN and $Si_3N_4$. After filtration, the compact exhibits a $TiB_2$ composition gradient from the upstream to the downstream sides. This compact or filter cake is fired at a suitable temperature, e.g. 1500° C., to sinter the compact, and to develop physical properties suitable for the proposed application. This operation may be advantageously carried out in a nitrogen atmosphere to promote formation of aluminium nitride to contribute to the sintering process. Reactive sintering may be further enhanced if the carrier alloy contains an appreciable amount of silicon. Formation of silicon nitride through reactive sintering is a standard ceramic procedure.

In another alternative already referrred to the filter comprises a bed of loose granular aggregate, supported on a refractory alumina grille. The aggregate may be composed of one or more of the substances for the compacts. The granular aggregate is preferably of a particle size such that all passes through 3 mesh. After passage of the molten aluminium-$TiB_2$ alloy, $TiB_2$ particles would be retained in the interstices between the refractory granules. This material is removed from the apparatus, ground, formed into the required shape and sintered. A reactive powder, such as fine alumina or silicon, may be added to promote sintering, and nitrogen atmosphere could be used as before to promote bonding.

Alternatively, only alumina-saturated $TiB_2$ particles can be removed from a "permanent" filter, and then either directly formed or mixed with an appropriate ceramic power prior to forming and sintering. In this way carbon may be employed for making the composites of the invention.

We claim:

1. A method of making a composite refractory material containing a proportion of transition metal diboride particles characterized by establishing a body of molten aluminium containing suspended transition metal diboride particles, filtering said molten aluminium by passing it through a body of a refractory substance other than said transition metal diboride, said refractory substance being inert with respect to aluminium metal and the transition metal diboride and insoluble in aluminium metal, to deposit said transition metal diboride particles on and in said body of refractory substance, and then subjecting the refractory substance carrying the transition metal diboride particles to a sintering operation.

2. A method according to claim 1, further characterized in that the transition metal diboride is titanium diboride.

3. A method according to claim 1, further characterized in that said other refractory substance is selected for properties of resistance to attack by molten aluminium for use in aluminium reduction cells.

4. A method according to claim 1, further characterized in that said body of refractory substance is constituted by a body of loose refractory granules.

5. A method according to claim 1, further characterized in that said body of refractory substance is in the form of a coherent porous mass, permeable to aluminium, said method including collecting a transition metal diboride-rich layer adjacent one face of said mass.

6. A method according to claim 1, further characterized in that after passage of transition metal diboride-bearing molten aluminium, said body of refractory substance is comminuted, formed into green shapes and fired to form ceramic bodies.

7. A method according to claim 6, further characterized in that said comminuted refractory materials are mixed with reactive alumina or silicon powder before forming into green shapes.

8. A method according to claim 6, further characterized in that silicon is incorporated in said comminuted refractory material and the green shapes are fired in a nitrogen atmosphere to promote the growth of silicon nitride therein.

9. A method according to claim 5, wherein the mass incldes aluminium metal or an alloy thereof and the sintering operation is carried out in a nitrogen atmosphere so as to promote the formation of aluminium nitride.

* * * * *